July 25, 1967 J. E. WIRTZ ETAL 3,332,340
TACO HOLDER
Filed Feb. 10, 1966
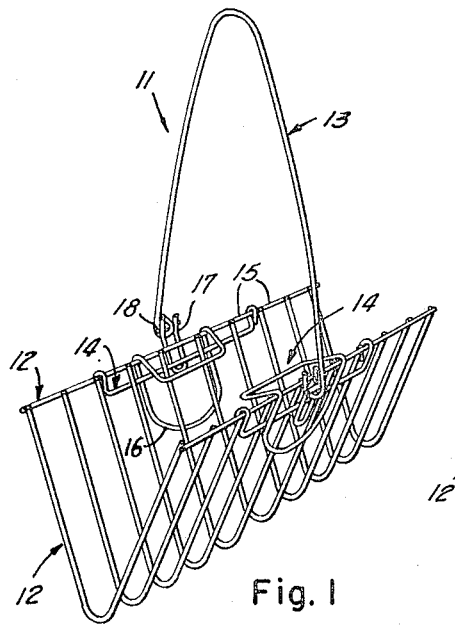
Fig. 1
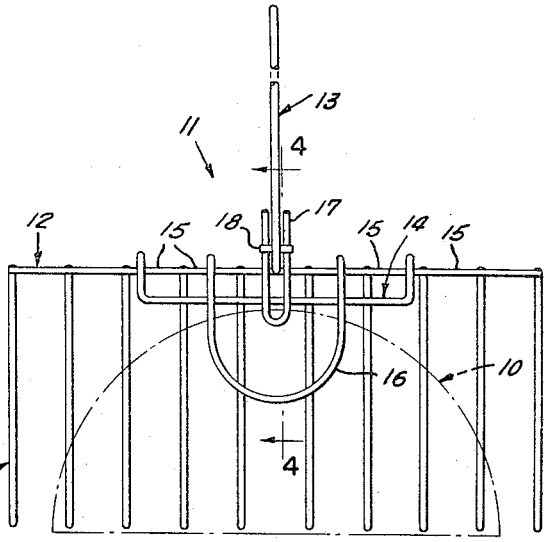
Fig. 2
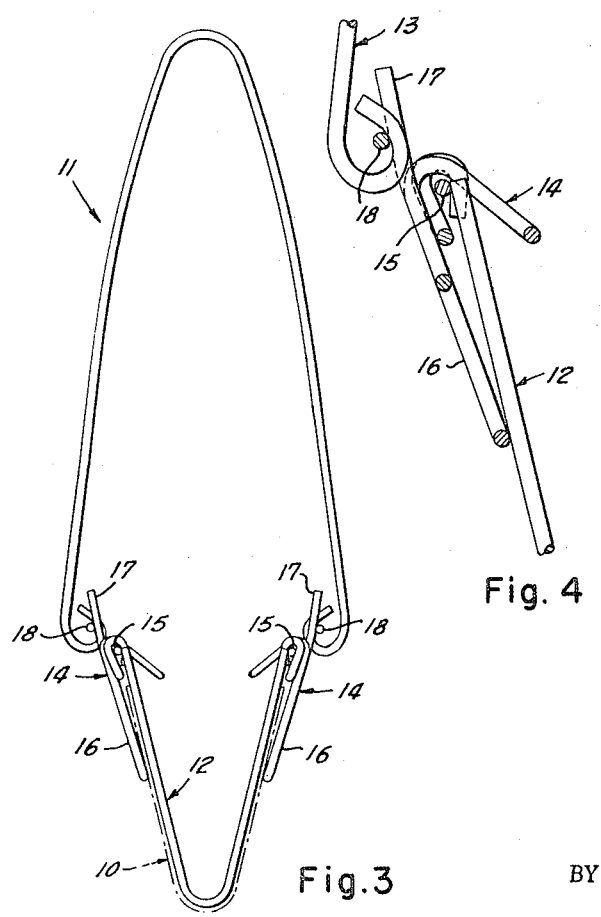
Fig. 3
Fig. 4
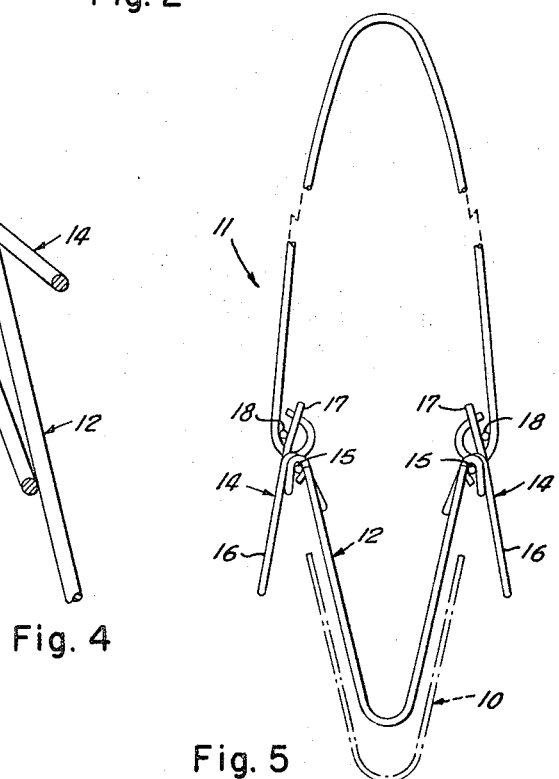
Fig. 5
INVENTORS
James E. Wirtz
Charles G. Kidd
BY Cecil L. Wood
ATTORNEY

United States Patent Office 3,332,340
Patented July 25, 1967

3,332,340
TACO HOLDER
James E. Wirtz, 3327 Happy Valley, Little Rock, Ark. 72207, and Charles G. Kidd, Little Rock, Ark. (P.O. Box 488, Paris, Tex. 75460)
Filed Feb. 10, 1966, Ser. No. 526,557
3 Claims. (Cl. 99—426)

This invention relates to a tortilla holder, and it has particular reference to a device for use as a hand tool for holding a single tortilla in substantially V shaped, diametrically folded position while frying it in deep fat to produce an edible product which advantageously may comprise the outer shell or wrapper of a conventional taco.

In making articles of food of Mexican origin commonly known as "tacos" it is common practice to provide a hard, crunchy edible shell or wrapper which is formed by frying a preformed "tortilla," which is a thin, generally circular cake formed of corn meal paste, while holding it in substantially V shaped, diametrically folded position. The taco is completed by adding the filler, which may include meat in association with a chopped mixture of lettuce and tomatoes, for example.

A prime object of the invention is that of providing a simple and economical device for use as a hand tool for holding a tortilla in substantially V shaped, diametrically folded position while frying it to produce an edible product which is correspondingly shaped.

Another object of the invention is that of providing a tortilla holder having an elongated, normally horizontally extending open frame body, substantially V shaped in transverse section, providing a discontinuous surface on its under side for opposing engagement by one side of a tortilla in its folded position, having a yieldable bail of inverted V shape intermediate its ends, and having a pair of pivoted members on opposite sides of the body, immediately adjacent its upper longitudinal edges, respectively, each pivotally connected to the body and to one end of the bail and having a depending portion for yieldable clamping engagement with the side of the tortilla opposite said one side, adjacent its peripheral edge, in response to spreading of the opposite end portions of the bail due to its inherent spring tension, whereby the tortilla is adapted to be releasably secured between said body and said pivoted members.

A further object of the invention resides in the provision of a tortilla holder for use as described which is characterized by its simplicity and which advantageously may be formed in its entirety of wire, and which is efficient in operation and durable in use, and may be produced inexpensively.

Broadly, the invention contemplates the provision of a tortilla holder as described having an elongated, normally horizontally extending open frame body, substantially V shaped in transverse section, having a bail of inverted V shape, characterized by its inherent spring tension and adapted to be grasped bodily between the fingers of one hand whereby opposite end portions of the bail may be squeezed together, and having a pair of pivoted members each pivotally connected to one side of the body intermediate its ends, adjacent one of its upper longtudinal edges, for rotative adjustment about a horizontal axis coinciding with said longtiudinal edge, said pivoted members each having a depending portion overlying a marginal portion of the body, exteriorly thereof, below said longitudinal edge, and having an upstanding portion extending above said longitudinal edge, and the bail having its opposite ends pivotally connected to said upstanding portions of said pivoted members whereby said depending portions of said pivoted members are yieldably urged in overlying clamping engagement with the corresponding sides of the body in response to the inherent spring tension of the bail, whereby opposite end portions of the bail are urged apart, and said pivoted members are adapted to be disengaged from clamping engagement with said body upon squeezing opposite end portions of said bail together.

In use a preformed tortilla is folded over the under side of the body and has its diametrically opposite edge portions releasably secured between said pivoted members, respectively, and the opposing surfaces of the body.

While the foregoing objects are paramount, other and lesser objects will become apparent as the description proceeds, when considered in connection with the appended drawings wherein:

FIGURE 1 is a perspective view of a tortilla holder embodying the invention.

FIGURE 2 is a side elevational view, showing in broken lines a tortilla releasably secured to the under side of the body by engagement of the clamping members with peripheral edge portions thereof.

FIGURE 3 is an end elevational view on an enlarged scale, showing in broken lines a tortilla releasably secured to the under side of the body as illustrated in FIGURE 2.

FIGURE 4 is a fragmentary sectional elevational view on an enlarged scale, taken on the line 4—4 of FIGURE 2, and FIGURE 5 is a view similar to FIGURE 3, showing in broken lines a tortilla as it is disengaged from the holder.

Referring to the drawing, the numeral 10 designates generally a tortilla, shown in broken lines in FIGURES 2, 3, and 5, and the numeral 11 indicates generally a holder for a single tortilla such as the tortilla 10 as hereinafter described.

The holder 11, which as shown is formed in its entirety of wire, includes an elongated, normally horizontally extending open frame body, indicated generally by the numeral 12. The body 12, the exact structure of which may vary within reasonable limits, as desired, is substantially V shaped in transverse section and provides a discontinuous surface on its under side for opposing engagement by one side of a tortilla such as the tortilla 10 in its folded position.

The holder 11 has a bail, indicated by the numeral 13, which is of inverted V shape and is characterized by its inherent spring tension. The bail 13 is adapted to be grasped bodily between the fingers of one hand whereby opposite end portions of the bail 13 may be squeezed together.

The holder 11 has a pair of pivoted members, indicated by the numerals 14, which are each pivotally connected to one side of the body 12 intermediate its ends, adjacent one of its upper longitudinal edges, as at 15, for rotative adjustment about a horizontal axis coinciding with said longitudinal edge. The pivoted members 14 each have a depending portion 16 which overlies a marginal portion of the body 12, exteriorly thereof, below said longitudinal edge, and have an upstanding portion 17 which extends above said longitudinal edge.

The bail 13 has its opposite ends pivotally connected to the upstanding portions 17 of the pivoted members 14, as at 18, whereby the depending portions 16 of the pivoted members 14 are yieldably urged in overlying clamping engagement with the corresponding sides of the body 12 in response to the inherent spring tension of the bail 13, whereby opposite end portions of the bail 13 are urged apart, and the pivoted members 14 are adapted to be disengaged from the body 12 upon squeezing opposite end portions of the bail 13 together.

The depending portions 16 of the pivoted members 14 are engageable with the side of a tortilla such as the tortilla 10 opposite said one side, adjacent its peripheral edge and in diametrically opposite relation to each other, relative to the tortilla, whereby the tortilla is adapted to be releasably secured between the body 12 and the pivoted members 14.

The invention may be modified within certain limitations, by persons skilled in the art, without departing from the spirit and intent thereof or the scope of the appended claims.

What is claimed is:

1. In a device for use as a hand tool for holding a tortilla in substantially V shaped, diametrically folded position while frying it to produce an edible product which is correspondingly shaped, the combination of an elongated, normally horizontally extending open frame body, substantially V shaped in transverse section, providing a discontinuous surface on its under side for opposing engagement by one side of a tortilla in its folded position, a yieldable bail of inverted V shaped intermediate the ends of said body, and a pair of pivoted members on opposite sides of said body, immediately adjacent its upper longitudinal edges, respectively, each pivotally connected to said body and to one end of said bail and having a depending portion for yieldable clamping engagement with the side of said tortilla opposite said one side, adjacent its peripheral edge, in response to spreading of opposite end portions of said bail due to its inherent spring tension, whereby said tortilla is adapted to be releasably secured between said body and said pivoted members.

2. The structure of claim 1, said pivoted members each being pivotally connected to one side of said body intermediate its ends, adjacent one of its upper longitudinal edges, for rotative adjustment about a horizontal axis substantially coinciding with said longitudinal edge, said depending portions of said pivoted members each overlying a marginal portion of said body, exteriorly thereof, below said longitudinal edge, said pivoted members each having an upstanding portion extending above said longitudinal edge, and said bail having its opposite ends pivotally connected to said upstanding portions of said pivoted members whereby said depending portions of said pivoted members are yieldably urged in overlying clamping engagement with the corresponding sides of said body in response to the inherent spring tension of said bail, whereby opposite end portions of said bail are urged apart.

3. The structure of claim 2, said bail being adapted to be grasped bodily between the fingers of one hand whereby opposite end portions of said bail may be squeezed together, to thereby disengage said pivoted members from clamping engagement with said body.

References Cited
UNITED STATES PATENTS

| | | | |
|---|---|---|---|
| 2,775,929 | 1/1957 | Johnson et al. | 99—426 |
| 2,792,774 | 5/1957 | Veach | 99—426 |
| 2,847,933 | 8/1958 | Pate | 99—426 |
| 2,957,404 | 10/1960 | Richardson | 99—426 |
| 3,020,826 | 2/1962 | Silva | 99—426 |

WALTER A. SCHEEL, *Primary Examiner.*

ARTHUR O. HENDERSON, *Assistant Examiner.*